United States Patent [19]

Itoh et al.

[11] Patent Number: 5,597,853

[45] Date of Patent: Jan. 28, 1997

US005597853A

[54] SILICONE RUBBER COMPOSITIONS

[75] Inventors: Kunio Itoh; Toshio Shinohara; Masaharu Takahashi, all of Usui-gun, Japan

[73] Assignee: Shin-Etsu Chemical Co., Ltd., Tokyo, Japan

[21] Appl. No.: 337,002

[22] Filed: Nov. 7, 1994

[30] Foreign Application Priority Data

Nov. 8, 1993 [JP] Japan .................................. 5-302409
Feb. 17, 1994 [JP] Japan .................................. 6-043195

[51] Int. Cl.⁶ .............................. C08K 9/06; C08K 5/54
[52] U.S. Cl. ........................ 523/213; 523/212; 524/265; 524/493; 524/588; 524/731; 524/847; 524/862
[58] Field of Search ................................ 524/588, 265, 524/493, 860, 731, 847, 862; 523/212, 213

[56] References Cited

U.S. PATENT DOCUMENTS

| | | | |
|---|---|---|---|
| 3,855,171 | 12/1974 | Wegehaupt et al. | 260/375 B |
| 4,500,659 | 2/1985 | Kroupa et al. | 523/213 |
| 5,276,087 | 1/1994 | Fujiki et al. | 524/863 |
| 5,326,816 | 7/1994 | Kinami et al. | 524/863 |

*Primary Examiner*—Karen A. Dean
*Attorney, Agent, or Firm*—Millen, White, Zelano & Branigan, P.C.

[57] ABSTRACT

A silicone rubber composition comprising an organopolysiloxane and a reinforcing silica filler can be improved in crepe hardening and shelf stability by blending a specific compound as a wetter.

14 Claims, No Drawings

SILICONE RUBBER COMPOSITIONS

BACKGROUND OF THE INVENTION

1. Field of the Invention

This invention relates to a silicone rubber composition having improved crepe hardening and shelf stability.

2. Prior Art

It is known in the art that silicone polymers can be improved in physical properties such as tensile strength, tear strength, elongation, and heat resistance by blending large amounts of silica filler. However, in order to blend large amounts of silica filler in silicone polymers, large amounts of a wetter or dispersant must be added for improving the dispersibility of the silica filler.

One commonly used wetter is α,ω-siloxane diol represented by the formula: $HO[(CH_3)_2SiO]_xH$ wherein x is a number of 10 to 20 and having a degree of polymerization of 10 to 20 as disclosed in U.S. Pat. No. 3,799,962. Also known is α-alkoxy-ω-siloxanol of the formula: $RO[(CH_3)_2SiO]_yH$ wherein R is a short chain alkyl group and y is a number of 3 to 5. Further an anti-structure agent in the form of a mixture of hexamethyltrisiloxane diol and methoxyhexamethyltrisiloxanol is proposed in U.S. Pat. No. 3,925,285.

However, these prior art wetters suffer from a tacky problem. If the wetter is added in relatively large amounts for reducing crepe hardening, the resulting silicone rubber composition becomes sticky and difficult to work with and cures into products having poor mechanical properties. If the amount of wetter is restricted for preventing the compositions from becoming sticky, the composition becomes tack-free, but undergoes substantial crepe hardening. There is a desire to have a wetter which can minimize crepe hardening, eliminate stickiness, and improve the mechanical properties of cured products.

More particularly, when a silicone rubber composition is compounded, silica and the polymer are in wet contact. If the composition is stored in an unvulcanized state, pseudo crosslinking takes place between silica and the polymer due to hydrogen bonds and physical bonds by van der Waals forces. This phenomenon is known as crepe hardening. Once crepe hardening occurs, the composition turns to be very difficult to work with. The original state can be recovered by fully milling the composition with sufficient shearing forces. Of course, such additional milling is commercially disadvantageous.

Prior art wetters have a problem with respect to the compression set and mechanical strength of silicone rubber which has been vulcanized with vulcanizing agents added.

A further problem is that prior art wetters fail to provide transparent silicone rubber.

SUMMARY OF THE INVENTION

An object of the present invention is to provide a novel and improved silicone rubber composition which is improved in crepe hardening and shelf stability and cures to silicone rubber having reduced compression set, excellent mechanical strength and transparency.

The present invention is directed to a silicone rubber composition comprising (A) an organopolysiloxane of the following general formula (1) having an average degree of polymerization of at least 100, and (B) a reinforcing silica filler having a specific surface area of at least 50 m²/g as measured by a BET method. According to the present invention, (C) a compound of the following general formula (2), (3) or (4) is blended in the silicone rubber composition as a wetter.

$$R^1_a SiO_{(4-a)/2} \quad (1)$$

In formula (1), $R^1$ is a substituted or unsubstituted monovalent hydrocarbon group, 0.001 to 0.5 mol % of the $R^1$ group being an alkenyl group, and letter a is a positive number of 1.95 to 2.05.

$$\begin{array}{c} R^2 \quad\quad R^2 \\ | \quad\quad\quad | \\ HO-Si-O-Si-OH \\ | \quad\quad\quad | \\ R^2 \quad\quad R^2 \end{array} \quad (2)$$

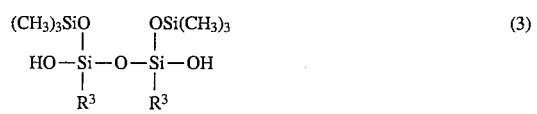

$$\begin{array}{c} (CH_3)_3SiO \quad\quad OSi(CH_3)_3 \\ | \quad\quad\quad\quad | \\ HO-Si-O-Si-OH \\ | \quad\quad\quad\quad | \\ R^3 \quad\quad\quad\quad R^3 \end{array} \quad (3)$$

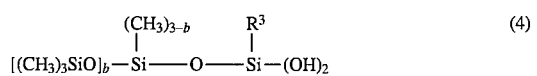

$$[(CH_3)_3SiO]_b-Si \begin{array}{c} (CH_3)_{3-b} \\ | \end{array} - O - Si \begin{array}{c} R^3 \\ | \end{array} -(OH)_2 \quad (4)$$

In formulae (2), (3), and (4), $R^2$ is a substituted or unsubstituted monovalent hydrocarbon group having 1 to 10 carbon atoms, preferably a methyl group, $R^3$ is a methyl, trimethylsiloxy, vinyl or trifluoropropyl group, preferably a methyl or trimethylsiloxy group, and letter b is equal to 0, 1, 2 or 3.

By blending a compound of formula (2), (3) or (4) in a silicone rubber composition of components (A) and (B), the composition is significantly improved in crepe hardening and experiences a minimal rise of plasticity even after long-term storage. Because of an increased silanol content, the wetter of formula (2), (3) or (4) effectively acts in small amounts to adjust the silicone rubber compound so that it is non-sticky at the surface and improved in workability. An additional advantage is that highly active silanol groups help blending of silica and similar fillers.

Further, the silicone rubber composition having the compound of formula (2), (3) or (4) blended therein cures into silicone rubber products having minimal compression set, excellent mechanical strength and high transparency.

As previously mentioned, the conventional well-known α,ω-siloxane diol oil which is widely used as a wetter in the prior art has the drawback of adversely affecting green strength by lowering the plasticity or Mooney viscosity of a silicone rubber compound. It also interferes with working parameters such as shape retention of raw compound, roll release and foaming suppression, increases compression set, and reduces mechanical strength. Most of the conventional α,ω-siloxane diols generally have a degree of polymerization of 5 to 100, especially 10 to 20 for use as a wetter. The use of the compounds of formulae (2), (3) and (4) solves the problems of the prior art.

DETAILED DESCRIPTION OF THE INVENTION

Component (A) of the silicone rubber composition according to the invention is an organopolysiloxane of the following general formula (1):

$$R^1_a SiO_{(4-a)/2} \quad (1)$$

wherein $R^1$ is a substituted or unsubstituted monovalent hydrocarbon group, 0.001 to 0.5 mol % of the $R^1$ group being an alkenyl group, and letter a is a positive number of 1.95 to 2.05. It has an average degree of polymerization of at least 100.

In formula (1), $R^1$ is a substituted or unsubstituted monovalent hydrocarbon group preferably having 1 to 10 carbon atoms, more preferably 1 to 6 carbon atoms. An alkenyl group should be contained in an amount of 0.001 to 0.5 mol %, especially 0.01 to 0.3 mol % of the entire $R^1$ groups. Exemplary alkenyl groups are vinyl, allyl and butenyl groups, with the vinyl group being preferred. If the content of alkenyl group is less than 0.001 mol % of the $R^1$ groups, the resulting composition is less curable. If the content of alkenyl group is more than 0.5 mol % of the $R^1$ groups, the composition results in a cured product having poor physical properties such as tensile strength, tear strength and elongation.

Examples of the $R^1$ group other than the alkenyl group include hydrocarbon groups, for example, alkyl groups such as methyl, ethyl, propyl, butyl, pentyl, hexyl, octyl, decyl and dodecyl; aryl groups such as phenyl and tolyl; aralkyl groups such as β-phenylethyl, and substituted hydrocarbon groups wherein some or all of the hydrogen atoms are replaced by halogen atoms or cyano groups, for example, 3,3,3-trifluoropropyl and cyanoethyl groups. In general, a methyl group is preferred among others. Where it is desired to impart low-temperature resistance, radiation resistance and transparency, a phenyl groups should preferably be contained in an amount of 2 to 20 mol % of the entire $R^1$ groups. Where it is desired to impart oil resistance and gasoline resistance, a cyanoethyl, 3,3,3-trifluoropropyl or substituted group should preferably be contained in an amount of 5 to 70 mol % of the entire $R^1$ groups.

Letter a is a positive number of 1.95 to 2.05, preferably 1.98 to 2.02. If a is outside the range, it is difficult to synthesize an organopolysiloxane having an average degree of polymerization of at least 100.

The organopolysiloxane as component (A) is essentially composed of diorganosiloxane units although triorganosiloxane and $SiO_2$ units may be present in a minor amount of less than about 1 mol %. Also it may be blocked with a hydroxyl group or triorganosiloxy group at a molecular chain end. The organopolysiloxane has an average degree of polymerization of at least 100 in order that a cured product have sufficient mechanical strength, preferably 100 to 10,000, more preferably 2,000 to 10,000. The organopolysiloxanes may be used alone or in admixture of two or more.

Component (B) of the silicone rubber composition is a reinforcing silica filler having a specific surface area of at least 50 $m^2/g$ as measured by a BET method. Examples include fumed silica and precipitated silica, which may be used alone or in admixture of two or more. The silica fillers may have been treated at the surface with suitable agents such as linear organopolysiloxanes, cyclic organopolysiloxanes and hexamethyldisilazane.

For imparting transparency and reinforcement to a silicone rubber composition, fumed silica having a specific surface area of 100 to 400 $m^2/g$ is preferred. Reinforcing precipitated silica having a specific surface area of 50 to 800 $m^2/g$ is preferred when the cost and physical properties (elasticity) of the resulting silicone rubber composition are important.

Preferably about 5 to 100 parts by weight, more preferably about 10 to 50 parts by weight of silica filler (B) is blended with 100 parts by weight of organopolysiloxane (A). Outside the range, silicone rubber compositions would be less workable and cured products therefrom would be low in mechanical strength such as tensile strength and tear strength.

According to the present invention, a compound of formula (2), (3) or (4) is blended as a wetter or dispersant (C) in a silicone rubber composition comprising the organopolysiloxane (A) and silica filler (B) defined above whereby the composition is significantly improved in crepe hardening.

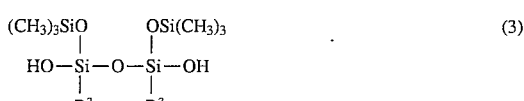

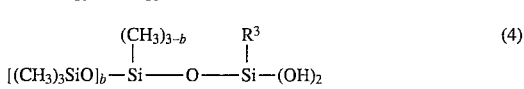

In a 1,1,3,3-tetraorganodisiloxane-1,3-diol of formula (2), $R^2$ is a substituted or unsubstituted monovalent hydro carbon group having 1 to 10 carbon atoms, preferably 1 to 6 carbon atoms. The $R^2$ groups may be identical or different. Exemplary monovalent hydrocarbon groups represented by $R^2$ are the same as mentioned for $R^1$. Better results are obtained when $R^2$ is a methyl, vinyl or 3,3,3-trifluoropropyl group, with the methyl group being most preferred.

The disiloxane diol of formula (2) can be synthesized by any conventional well-known method. For example, 1,1,3, 3-tetramethyldisiloxane-1,3-diol can be prepared by carrying out hydrolysis in the presence of 1,3-dichlorotetradisiloxane, diethyl ether, water, ammonium carbonate and dimethylaminopyridine, followed by distillation as described in Journal of Organometallic Chemistry, 453 (1993), 13–16.

In formulae (3) and (4), $R^3$ is a methyl, trimethylsiloxy, vinyl or trifluoropropyl group, and letter b is equal to 0, 1, 2 or 3.

The compound of formula (4) can be prepared by a well-known method as shown below.

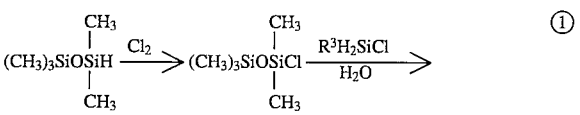

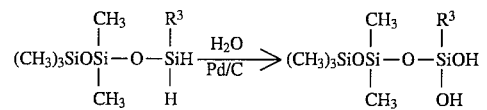

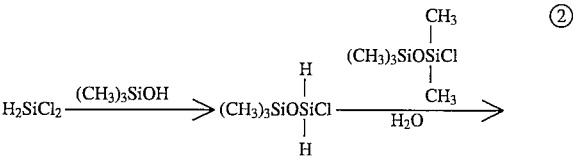

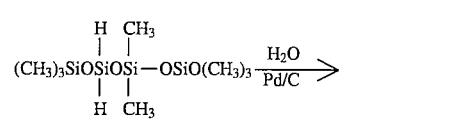

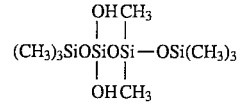

-continued

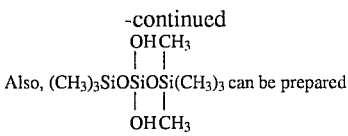

by Kappler method (see K, Kappler et al., J. Organomet. Chem. 402 (1991), 155).

The compound of formula (3) can also be prepared by a well-known method, for example, by hydrolyzing 1,1,1,3,5,7,7,7-octamethyltetrasiloxane or 3,5-bis(trimethylsiloxy)-1,1,1,7,7,7-hexamethyltetrasiloxane in the presence of a Pd/C catalyst.

The compounds of formulae (2), (3) and (4) may be used alone or in admixture of two or more. The compound (C) is preferably blended in an amount of about 1 to 30% by weight, more preferably about 1 to 20% by weight based on the weight of the silica filler (B). Less than 1% by weight of component (C) would not be effective for improving crepe hardening because the silica remains too active. Blending more than 30% by weight of component (C) would result in a sticky composition which goes limp and is expensive.

The silicone rubber composition is prepared by mixing the organopolysiloxane, silica filler and compound of formula (2), (3) or (4) in a milling means such as a kneader. Other useful milling means are twin roll mills, Bunbary mixers or continuous kneaders, and pressure kneaders.

The thus obtained composition may be allowed to stand at room temperature for one hour to one day for permitting the components to merge or disperse with each other or if desired, dispersed by mixing at 40° to 70° C. for several minutes to several hours for the same purpose. If desired for enhancing the dispersibility of the compound of formula (2), (3) or (4), a solvent such as alcohol, toluene and xylene or a compatible component such as silane and siloxane may be used in combination.

If desired, the composition can be heat treated for enhancing the affinity between the organopolysiloxane and silica therein. To this end, the composition is preferably heat treated at a temperature of 50° to 300° C., more preferably 100° to 250° C. for about 10 to 120 minutes.

In this way, there is obtained a silicone rubber composition which is improved in crepe hardening.

It will be understood that any of additives commonly blended in conventional silicone rubbers may be added to the inventive silicone rubber composition. Such additives include ground silica, diatomaceous earth, iron oxide, zinc oxide, titanium oxide, carbon black, barium oxide, magnesium oxide, cerium hydroxide, calcium carbonate, magnesium carbonate, zinc carbonate, asbestos, glass wool, ground mica, fused silica powder, etc. Optionally, there may be blended pigments, dyes, anti-aging agents, anti-oxidants, anti-static agents, flame retardants (e.g., antimony oxide and chlorinated paraffin), and heat transfer enhancers (e.g., boron nitride and aluminum oxide).

The silicone rubber composition of the invention is cured into silicone rubber using a curing agent. In curing the silicone rubber composition by utilizing hydrosilylation reaction, a curing agent of organohydrogenpolysiloxane combined with a platinum group metal catalyst is used. In curing the composition-through peroxide crosslinking, a peroxide catalyst is used.

More particularly, in curing through hydrosilylation reaction, a curing agent of organohydrogenpolysiloxane combined with a platinum group metal catalyst is used. Curing can be complete by heating at a temperature of 60° to 200° C. for ½ minute to 5 hours. One exemplary organohydrogenpolysiloxane used herein is an organopolysiloxane of the following average compositional formula (5):

$$R_c^4 H_d SiO_{(4-c-d)/2} \quad (5)$$

wherein $R^4$ is a substituted or unsubstituted monovalent hydrocarbon group having 1 to 10 carbon atoms, $0 \leq c < 3$ and $0 < d \leq 3$, and $1.0 \leq c+d \leq 3.0$, having at least two —SiH groups in a molecule while the —SiH groups may be at the end or an intermediate of the polysiloxane chain. Examples of the hydrocarbon group represented by $R^4$ include alkyl groups such as methyl, ethyl, propyl, and butyl groups, aryl groups such as phenyl and tolyl groups, and substituted hydrocarbon groups such as 3,3,3 -trifluoropropyl.

The organohydrogenpolysiloxane used as the curing agent preferably has a degree of polymerization of up to 200 and may be linear, cyclic or branched. Examples are given below.

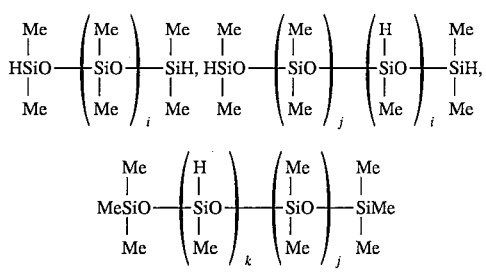

In the formulae, Me is methyl, i and j are positive integers (inclusive of 0) and k is a positive integer of at least 2.

The organohydrogenpolysiloxane is preferably used in such an amount that there is 0.5 to 3 mol, especially 1 to 2 mol of ≡SiH group per mol of the alkenyl group in component (A) or organopolysiloxane.

The platinum group metal catalyst used concurrently therewith may be selected from well-known platinum, palladium and rhodium catalysts, with the platinum catalysts being preferred. Exemplary platinum catalysts include the finely divided metallic platinum catalyst described in U.S. Pat. No. 2,970,150, the chloroplatinic acid catalyst described in U.S. Pat. No. 2,823,218, the platinum-hydrocarbon complex compounds described in U.S. Pat. Nos. 3,159,601 and 3,159,662, the chloroplatinic acid-olefin complex compound described in U.S. Pat. No. 3,516,946, and the platinum-vinyl siloxane complex described in U.S. Pat. Nos. 3,775,452 and 3,814,780. The platinum group metal catalyst is preferably used in such an amount that there is 0.1 to 1,000 parts, especially 1 to 100 parts by weight of metallic platinum per million parts by weight of the total of the organopolysiloxane (A) and the organohydrogenpolysiloxane. For a composition which cures through hydrosilylation reaction, a reaction control agent such as methylvinyl-cyclotetrasiloxane and acetylene alcohol may be added in order to improve shelf stability at room temperature and to provide an adequate pot life.

Alternatively, the silicone rubber composition is vulcanized in the presence of an organic peroxide catalyst. The organic peroxide is preferably added in an amount of about 0.01 to 3 parts, more preferably about 0.05 to 1 part by weight per 100 parts by weight of the organopolysiloxane (A). With the aid of such peroxides, the silicone rubber compositions of the invention can be cured by heating at a temperature of about 100° to 500° C. for about 10 seconds to about 5 hours. The organic peroxide may be selected from those commonly used in the curing of peroxide curing type silicone rubbers, for example, benzoyl peroxide, monochlorobenzoyl peroxide, di-t-butyl peroxide, 2,5-dimethyl-di-t-butyl peroxide, p-methylbenzoyl peroxide, 2,4-dichlorobenzoyl peroxide, dicumyl peroxide, t-butyl perbenzoate, t-butyl peroxyisopropyl carbonate, dimyristylperoxycarbonate, dicyclododecylperoxydicarbonate, 2,5-bis(t-butylperoxy)-2,5-dimethylhexane, and 2,5-bis(t-butylperoxy)-2,5-dimethylhexine, alone or in admixture of two or more.

EXAMPLE

Examples of the present invention are given below by way of illustration and not by way of limitation. All parts are by weight.

EXAMPLE 1 & COMPARATIVE EXAMPLE 1

To 100 parts of a methylvinylpolysiloxane consisting of 99.825 mol % of a dimethylsiloxane $(CH_3)_2SiO$ unit, 0.15 mol % of a methylvinylsiloxane $(CH_3)(CH_2=CH)SiO$ unit and 0.025 mol % of a dimethylvinylsiloxane $(CH_2=CH)(CH_3)_2SiO_{1/2}$ unit and having an average degree of polymerization of 3,000 were added 47 parts of fumed silica having a specific surface area of 200 $m^2/g$ (Aerosil 200 commercially available from Nippon Aerosil K.K.) and 4 parts of 1,1,3,3-tetramethyldisiloxane-1,3-diol. The ingredients were uniformly mixed in a kneader mixer.

The mixture was allowed to stand overnight at room temperature, yielding a transparent rubber compound. The compound was heat treated at 100° C. for 30 minutes in the kneader, obtaining a base compound 1.

For comparison purposes, a base compound 2 (Comparative Example 1) was prepared by the same procedure as above except that 10 parts of α,ω-siloxane diol having an average degree of polymerization of 10 was used instead of 1,1,3,3-tetramethyldisiloxane-1,3-diol. When the α,ω-siloxane diol was used in an amount of 4 parts, the ingredients (especially fumed silica) were not uniformly mixed in the kneader mixer.

These silicone rubber compositions were evaluated for outer appearance and a change of plasticity with time according to JIS C-2123.

To 100 parts of each silicone rubber compound was added 1.5 parts of 2,4-dichlorobenzoyl peroxide (50% product). The compound was press cured at 120° C. for 10 minutes and post cured at 200° C. for 2 hours, obtaining a silicone rubber sheet, which was measured for physical properties according to JIS K-6301. The results are shown in Table 1.

TABLE 1

|  | Example 1 Base compound 1 | Comparative Example 1 Base compound 2 |
| --- | --- | --- |
| Outer appearance | transparent | slightly milky white transparent |
| Plasticity    initial | 255 | 230 |
| 1 day | 268 | 302 |
| 3 days | 272 | 345 |
| 7 days | 280 | 380 |
| Sheet physical properties |  |  |
| Hardness (JIS A scale) | 58 | 56 |
| Tensile strength (kgf/cm$^2$) | 119 | 98 |
| Elongation | 450 | 530 |
| Tear strength (kgf/cm) | 29 | 25 |
| Compression set @ 180° C. /22 hr. (%) | 13 | 23 |

It is evident from Table 1 that the inventive composition is improved as demonstrated by transparency and minimized crepe hardening.

EXAMPLE 2

A base compound 3 was prepared by the same procedure as in Example 1 except that 40 parts of precipitated silica (Nipsil Lp commercially available from Nippon Silica K.K.) was used instead of the fumed silica and the amount of 1,1,3,3-tetramethyldisiloxane-1,3-diol was changed to 1 part.

This compound was easily workable and had physical properties as shown in Table 2.

TABLE 2

|  | Example 2 Base compound 3 |
| --- | --- |
| Outer appearance | milky white transparent |
| Plasticity    initial | 240 |
| 1 day | 260 |
| 3 days | 262 |
| 7 days | 264 |
| Sheet physical properties |  |
| Hardness (JIS A scale) | 50 |
| Tensile strength (kgf/cm$^2$) | 103 |
| Elongation (%) | 350 |
| Tear strength (kgf/cm) | 12 |

EXAMPLE 3

To 100 parts of a trifluoropropylmethylvinylpolysiloxane consisting of 99.805 mol % of a $(CH_3)(CH_2CH_2CF_3)SiO$ unit, 0.17 mol % of a $(CH_3)(CH_2=CH)SiO$ unit and 0.025 mol % of a $(CH_2=CH)(CH_3)_2SiO_{1/2}$ unit and having an average degree of polymerization of 3,500 were added 43 parts of fumed silica having a specific surface area of 200 $m^2/g$ (Aerosil 200 commercially available from Nippon Aerosil K.K.) and 3 parts of 1,3-dimethyl-1,3-(3,3,3-trifluoropropyl)disiloxane-1,3-diol. The ingredients were uniformly mixed in a kneader mixer to form a homogenous solution. It was heat treated at 105° C. for one hour, obtaining a base compound 4.

To 100 parts of the base compound was added 1 part of dicumyl peroxide. The mixture was uniformly milled in a twin-roll mill and vulcanized at 165° C. for 10 minutes into a sheet of 2 mm gage. The sheet was subject to secondary curing at 200° C. for 4 hours. It was measured for physical properties as in Example 1. The results are shown in Table 3.

TABLE 3

|  | Example 3 Base compound 4 |
| --- | --- |
| Outer appearance | transparent |
| Plasticity    initial | 240 |
| 1 day | 255 |
| 3 days | 260 |
| 7 days | 265 |
| Sheet physical properties |  |
| Hardness (JIS A scale) | 52 |
| Tensile strength (kgf/cm$^2$) | 116 |
| Elongation (%) | 470 |
| Tear strength (kgf/cm) | 25 |

It is evident from Table 3 that the inventive composition is improved as demonstrated by transparency, minimized crepe hardening and satisfactory physical properties.

EXAMPLE 4

Base compound 4 used in Example 3 was subject to addition vulcanization. To 100 parts of base compound 4 were added 1.0 part of organohydrogenpolysiloxane (a molar ratio of SiH/vinyl of 1.3) and 1,000 ppm of a platinum catalyst. In a twin-roll mill, 0.02 part of 1-ethynylcyclohexan-1-ol was added as a control agent and the ingredients were uniformly milled. The composition was vulcanized at 165° C. for 10 minutes into a sheet of 2 mm gage. The sheet was subject to secondary curing at 200° C. for 4 hours. It was measured for physical properties as in Example 1. The results are shown in Table 4.

TABLE 4

|  | Example 4 Base compound 4 |
|---|---|
| Outer appearance | transparent |
| Sheet physical properties |  |
| Hardness (JIS A scale) | 50 |
| Tensile strength (kgf/cm$^2$) | 121 |
| Elongation (%) | 520 |
| Tear strength (kgf/cm) | 29 |

It is evident from Table 4 that the inventive composition is improved as demonstrated by transparency and satisfactory physical properties.

EXAMPLES 5-8 & COMPARATIVE EXAMPLE 2

To 100 parts of a methylvinylpolysiloxane consisting of 99.825 mol % of a dimethylsiloxane (CH$_3$)$_2$SiO unit, 0.15 mol % of a methylvinylsiloxane (CH$_3$)(CH$_2$=CH)SiO unit and 0.025 mol % of a dimethylvinylsiloxane (CH$_2$=CH)(CH$_3$)$_2$SiO$_{1/2}$ unit and having an average degree of polymerization of 3,000 were added 47 parts of fumed silica having a specific surface area of 200 m$^2$/g (Aerosil 200 commercially available from Nippon Aerosil K.K.) and 6 parts of the compound of the following formula (A). The ingredients were uniformly mixed in a kneader mixer.

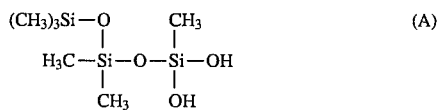
(A)

The mixture was allowed to stand overnight at room temperature, yielding a transparent rubber compound. The compound was heat treated at 100° C. for 30 minutes in a kneader, obtaining a base compound 5.

A base compound 6 was prepared by the same procedure as above except that the compound of formula (A) was replaced by 6 parts of the compound of the following formula (B).

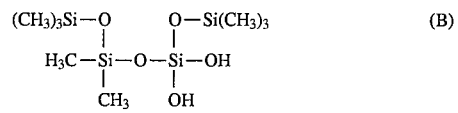
(B)

Base compounds 7 and 8 were prepared by the same procedure as above except that the compound of formula (A) was replaced by 4 parts of the compound of the following formula (C) or (D).

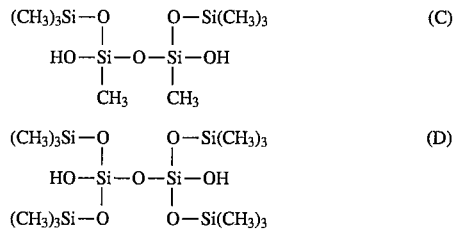
(C)

(D)

For comparison purposes, a base compound 9 (Comparative Example 2) was prepared by the same procedure as above except that 4 and 10 parts of α,ω-siloxane diol having an average degree of polymerization of 10 were used instead of the compound of formula (A). Blending of silica was difficult when 4 parts of α,ω-siloxane diol was used.

These silicone rubber compositions were evaluated for outer appearance and a change of plasticity with time according to JIS C-2123.

To 100 parts of each silicone rubber compound was added 1.5 parts of 2,4-dichlorobenzoyl peroxide (50% product). The compound was press cured at 120° C. for 10 minutes and post cured at 200° C. for 2 hours, obtaining a silicone rubber sheet. It was measured for physical properties according to JIS K-6301. The results are shown in Table 5.

TABLE 5

|  | Example 5 Base compound 5 | Example 6 Base compound 6 | Example 7 Base compound 7 | Example 8 Base compound 8 | Comparative Example 2 Base compound 9 |
|---|---|---|---|---|---|
| Outer appearance | transparent | transparent | transparent | transparent | slightly milky white transparent |
| Plasticity initial | 223 | 235 | 243 | 241 | 230 |
| 1 day | 235 | 247 | 255 | 252 | 302 |
| 3 days | 242 | 256 | 267 | 262 | 345 |
| 7 days | 253 | 269 | 270 | 271 | 380 |
| Sheet physical properties |  |  |  |  |  |
| Hardness (JIS A scale) | 56 | 55 | 57 | 56 | 56 |

TABLE 5-continued

|  | Example 5 Base compound 5 | Example 6 Base compound 6 | Example 7 Base compound 7 | Example 8 Base compound 8 | Comparative Example 2 Base compound 9 |
|---|---|---|---|---|---|
| Tensile strength | 106 | 109 | 109 | 113 | 98 |
| Elongation (%) | 430 | 475 | 460 | 465 | 530 |
| Tear strength (kgf/cm) | 29 | 28 | 28 | 27 | 25 |
| Compression set @ 180° C./22 hr. (%) | 13 | 15 | 12 | 13 | 23 |

It is evident from Table 5 that the inventive compositions are improved as demonstrated by transparency and minimized crepe hardening.

EXAMPLES 9–10

Base compounds 10 and 11 were prepared by the same procedure as in Example 5 except that 40 parts of precipitated silica (Nipsil Lp commercially available from Nippon Silica K.K.) was used instead of the fumed silica and the amount of the compound of formula (A) or (C) was changed to 2 parts.

The compounds were easily workable and had physical properties as shown in Table 6.

TABLE 6

|  | Example 9 Base compound 10 | Example 10 Base compound 11 |
|---|---|---|
| Outer appearance | milky white transparent | milky white transparent |
| Plasticity initial | 241 | 235 |
| 1 day | 259 | 256 |
| 3 days | 262 | 260 |
| 7 days | 265 | 266 |
| Sheet physical properties |  |  |
| Hardness (JIS A scale) | 47 | 48 |
| Tensile strength (kgf/cm²) | 103 | 98 |
| Elongation (%) | 375 | 365 |
| Tear strength (kgf/cm) | 14 | 12 |

EXAMPLES 11–12

Base compounds 5 and 7 used in Examples 5 and 7 were subject to addition vulcanization. To 100 parts of the base compound were added 1.0 part of organohydrogenpolysiloxane (a molar ratio of SiH/vinyl of 1.3) and 1,000 ppm of a platinum catalyst. In a twin-roll mill, 0.02 part of 1-ethynylcyclohexan-1-ol was added as a control agent and the ingredients were uniformly milled. The composition was vulcanized at 165° C. for 10 minutes into a sheet of 2 mm gage. The sheet was subject to secondary curing at 200° C. for 4 hours. It was measured for physical properties as in Example 5. The results are shown in Table 7.

TABLE 7

|  | Example 11 Base compound 5 | Example 12 Base compound 7 |
|---|---|---|
| Outer appearance | transparent | transparent |
| Sheet physical properties |  |  |
| Hardness (JIS A scale) | 51 | 52 |
| Tensile strength (kgf/cm²) | 126 | 123 |
| Elongation (%) | 515 | 505 |
| Tear strength (kgf/cm) | 31 | 28 |

It is evident from Table 7 that the inventive compositions are improved as demonstrated by transparency and satisfactory physical properties.

There has been described a silicone rubber composition which is improved in crepe hardening, shelf stability, and workability and cures to transparent silicone rubber having reduced compression set and excellent mechanical strength. The composition is suitable as a material to be extrusion molded into building gaskets and medical tubes. It will find additional use as rubber contacts, nipples, joint boots, plug boots, anode caps and wire insulators.

Japanese Patent Application Nos. 5-302409 and 6-43195 are incorporated herein by reference.

While this invention has been described with respect to a preferred embodiment, it will be understood by those skilled in the art that various changes and modifications may be made without departing from the spirit and scope of the invention.

We claim:

1. A silicone rubber composition comprising (A) an organopolysiloxane of the following general formula (1):

$$R_a^1 SiO_{(4-a)/2} \quad (1)$$

wherein $R^1$ is a substituted or unsubstituted monovalent hydrocarbon group, 0.001 to 0.5 mol % of the $R^1$ group being an alkenyl group, and letter a is a positive number of 1.95 to 2.05, having an average degree of polymerization of at least 100, (B) a reinforcing silica filler having a specific surface area of at least 50 m²/g as measured by a BET method, and (C) at least one wetter selected from compounds of the following general formulae (2), (3), and (4):

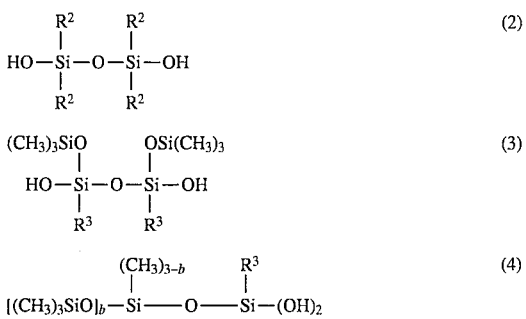

wherein $R^2$ is a substituted or unsubstituted monovalent hydrocarbon group having 1 to 10 carbon atoms, $R^3$ is a methyl, trimethylsiloxy, vinyl or trifluoropropyl group, and letter b is equal to 0, 1, 2 or 3.

2. The composition of claim 1 which contains 100 parts by weight of component (A), 5 to 100 parts by weight of component (B), and component (C) in an amount of 1 to 30% by weight based on the weight of component (B).

3. A silicone rubber composition as in claim 1, wherein the alkenyl group of $R^1$ is selected from the group consisting of vinyl, allyl and butenyl groups.

4. A silicone rubber composition as in claim 3, wherein the alkenyl group comprises 0.01 to 0.3 mol % based on the total mols of $R^1$ groups within the organopolysiloxane of general formula 1.

5. A silicone rubber composition as in claim 1, wherein $R^2$ of the general formula (2) is selected from methyl, vinyl or 3,3,3-trifluoropropyl.

6. A silicone rubber composition as in claim 1, which is transparent.

7. A silicone rubber composition as in claim 6, containing reinforcing silica filler with a specific surface area in the range of 100–400 m$^2$/g.

8. A silicone rubber composition as in claim 7, wherein the silica fillers are treated at the surface with linear organopolysiloxanes, cyclic organopolysiloxanes or hexamethyldisilazane.

9. A silicone rubber composition as in claim 1, wherein the amount of silica filler (B) ranges from 10–50 parts by weight per 100 parts of component (A).

10. A silicone rubber composition as in claim 1, which additionally contains a curing agent of organohydrogenpolysiloxane combined with a platinum group metal catalyst.

11. A silicone rubber composition of claim 1, wherein curing is accomplished via a hydrosilylation reaction.

12. A silicone rubber composition of claim 1, wherein curing is accomplished with an organic peroxide catalyst in an amount of from 0.01 to 3 parts by weight per 100 parts by weight of the organopolysiloxane (A).

13. A silicone rubber composition as in claim 12, wherein the curing catalyst is 2,4-dichlorobenzyl peroxide.

14. A silicone rubber composition comprising (A) an organopolysiloxane of the following general formula (1):

$$R_a^1SiO_{(4-a)/2} \tag{1}$$

wherein $R^1$ is a substituted or unsubstituted monovalent hydrocarbon group, 0.001 to 0.5 mol % of the $R^1$ group being an alkenyl group, and letter a is a positive number of 1.95 to 2.05, having an average degree of polymerization of at least 100, (B) a reinforcing silica filler having a specific surface area of at least 50 m$^2$/g as measured by a BET method, and (C) at least one wetter selected from

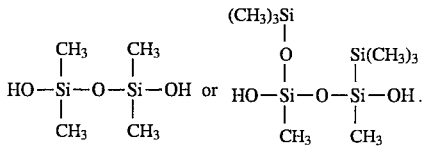

* * * * *